A. R. TURNER.
TAIL GATE FASTENER.
APPLICATION FILED JAN. 23, 1914.
1,117,930.
Patented Nov. 17, 1914.
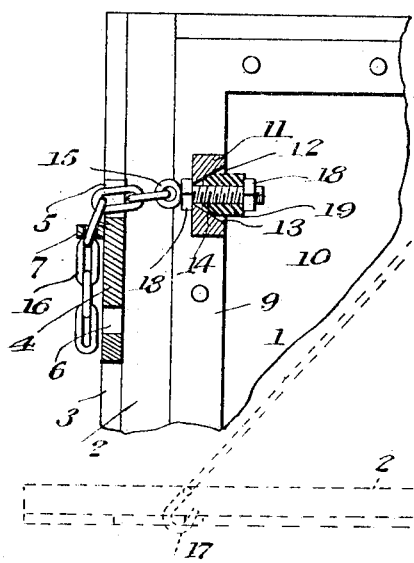
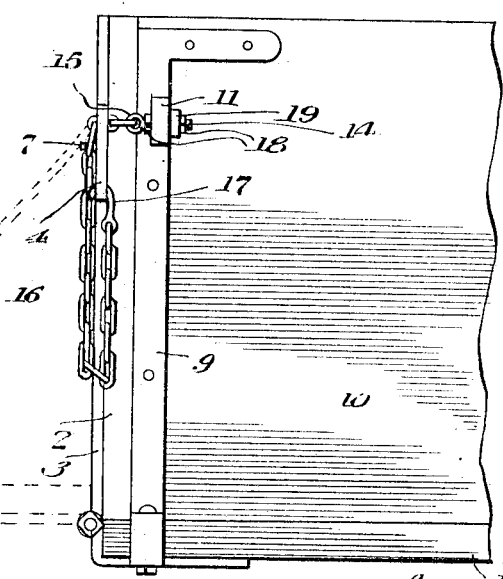
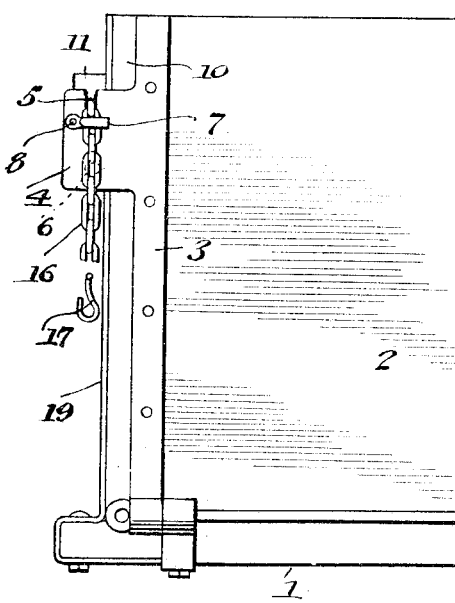
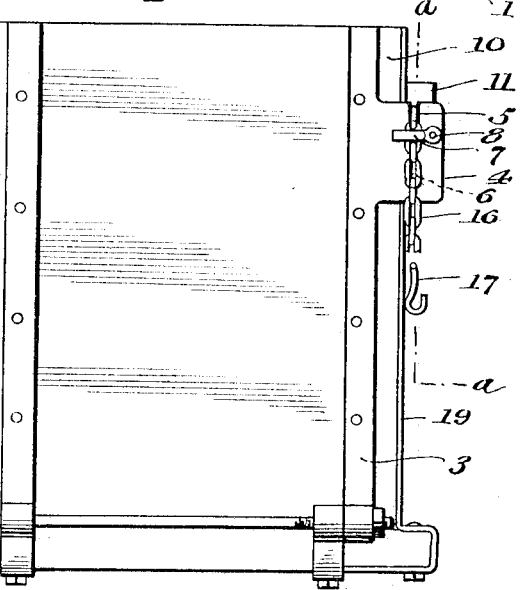
Witnesses
Frederic W. Ely
J W Gardner
Inventor
A. R. Turner
By Victor J. Evans
Attorney

UNITED STATES PATENT OFFICE.

ALTON R. TURNER, OF LIMA, OHIO.

TAIL-GATE FASTENER.

1,117,930.  Specification of Letters Patent.  Patented Nov. 17, 1914.

Application filed January 23, 1914. Serial No. 813,951.

*To all whom it may concern:*

Be it known that I, ALTON R. TURNER, a citizen of the United States, residing at Lima, in the county of Allen and State of Ohio, have invented new and useful Improvements in Tail-Gate Fasteners, of which the following is a specification.

This invention relates to improvements in end gates for wagons and especially with reference to improvements in means for fastening an end gate either in closed position, or in horizontal open position, the object of the invention being to provide improved end gate fasteners which prevent the rattling of an end gate, which may be readily and cheaply manufactured and applied to a wagon and gate for use and which are strong, durable, simple, and not likely to get out of order.

The invention consists in the construction, combination and arrangement of devices hereinafter described and claimed.

In the accompanying drawing:—Figure 1 is a side elevation of a portion of a wagon body provided with an end gate and fastening means therefor constructed in accordance with my invention, the gate being shown in closed position in full lines and in open lowered position in dotted lines. Fig. 2 is a rear elevation of the same, showing the gate closed. Fig. 3 is a detail sectional view on the plane indicated by the line *a—a* of Fig. 2 and on a larger scale.

For the purposes of this specification a portion of a wagon bed or body is indicated at 1 and an end gate at 2, the end gate being provided with hinge irons 3 whereby it is pivotally connected to the rear end of the body to enable the end gate to be readily opened or closed. In accordance with my invention each gate iron 3 is provided, at a suitable distance from its upper end, with an outwardly extending arm 4 which projects beyond one end of the gate, each arm having a vertically open slot 5 at its upper side, at its projecting portion and also having an opening or eye 6 at its lower side. Associated with each slot is a hook 7 which is pivotally connected to the arm as at 8. I also, in accordance with my invention provide each of the irons 9, which are on the outer sides of the side boards 10, at the rear ends thereof, with an outwardly extending lug 11, the said lug having an opening 12 extending therethrough from its front side to its rear side, the front end of the said opening being enlarged forwardly as at 13. A bolt 14 passes through each opening 12 and has an eye 15 at its rear end to which a chain 16 is attached, each chain having a hook 17 at its lower end. Nuts 18 are adjustable on the bolts 14 one of the nuts being near the front end of each bolt and the other nut being near the rear end thereof and each bolt also has a tubular rubber or other elastic cushion 19 thereon and which is arranged in the enlarged front end 13 of the opening 12 and held in place, together with the eye bolt, by means of the nuts 18. These cushions while holding the eye bolts in the openings 12 and preventing them from rattling therein enable the eye bolts to be drawn rearwardly to a slight extent to adapt the chains 16 to be engaged with the slots 5 of the arms 4 when the end gate is in vertical closed position, thus adapting the chains to readily secure the end gate in closed position. The hooks 7 should be then engaged with the chains to keep them from becoming disengaged from the slots 5.

The length of the chains is such that when the end gate is in horizontal lowered position, the hooks 17 may be engaged with the eyes or openings 6 to cause the chains to support and hold the gate in such closed position. From time to time the nuts 18 may be adjusted on the eye bolts to compensate for wear of the lugs 11 or to take up slack and thus keep the eye bolts from rattling. The tension of the rubber cushions 19 causes the eye bolts and chains to exert constant forward pull on the end gate so that the latter is prevented from rattling when closed.

While I have herein shown and described a preferred form of my invention I would have it understood that changes may be made in the form, proportion and construction of the several parts without departing from the spirit of the invention and within the scope of the appended claims.

Having thus described my invention, I claim:—

1. In a wagon body having irons on its sides provided with outwardly extending lugs, chains connected to the said lugs, and a hinged end gate having irons provided with outwardly extending arms, each of said arms having a slot in its upper side to receive one of the chains when the gate is in closed position, and also having an opening in its lower side, the chains being provided with hooks to engage said openings when the gate is in lowered position.

2. In a wagon body having irons on its sides provided with outwardly extending lugs, each lug having an opening which enlarges toward its front end, eye bolts extending through said openings and each having a cushioning member arranged in the front portion of one of said openings, said eye bolts being also provided with adjusting nuts in front and rear of said lugs, chains attached to the eyes of the eye bolts, an end gate having irons provided with outwardly extending arms, the said arms being each provided with a slot for engagement by one of the chains.

3. In a wagon body having irons on its sides provided with outwardly extending lugs, each lug having an opening which enlarges toward its front end, eye bolts extending through said openings and each having a cushioning member arranged in the front portion of one of said openings, said eye bolts being also provided with adjusting nuts in front and rear of said lugs, chains attached to the eyes of the eye bolts, an end gate having irons provided with outwardly extending arms, the said arms being each provided with a slot for engagement by one of the chains and being also provided with a hook to lock the chain in the slot.

In testimony whereof I affix my signature in presence of two witnesses.

ALTON R. TURNER.

Witnesses:
  A. E. HAYES,
  LURA P. HAYES.

Copies of this patent may be obtained for five cents each, by addressing the "Commissioner of Patents, Washington, D. C."